United States Patent
Chang et al.

(10) Patent No.: US 9,729,845 B2
(45) Date of Patent: Aug. 8, 2017

(54) STEREOSCOPIC VIEW SYNTHESIS METHOD AND APPARATUS USING THE SAME

(71) Applicant: Acer Incorporated, New Taipei (TW)

(72) Inventors: Tian-Sheuan Chang, New Taipei (TW); Yi-Chun Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 433 days.

(21) Appl. No.: 14/555,555

(22) Filed: Nov. 26, 2014

(65) Prior Publication Data

US 2015/0350632 A1 Dec. 3, 2015

(30) Foreign Application Priority Data

Jun. 3, 2014 (TW) .............................. 103119217 A

(51) Int. Cl.
H04N 13/00 (2006.01)
H04N 13/02 (2006.01)

(52) U.S. Cl.
CPC .............................. *H04N 13/0022* (2013.01)

(58) Field of Classification Search
USPC ...................................................... 348/42, 46
See application file for complete search history.

(56) References Cited

U.S. PATENT DOCUMENTS

2010/0103249 A1* 4/2010 Lipton ............... H04N 13/0022 348/51
2011/0316984 A1 12/2011 Akeley et al.
2012/0113093 A1 5/2012 Liao et al.
2012/0249750 A1 10/2012 Izzat et al.
2013/0009949 A1 1/2013 Hewes et al.
(Continued)

FOREIGN PATENT DOCUMENTS

CN 102006493 4/2011
CN 102006494 4/2011
(Continued)

OTHER PUBLICATIONS

Hoffman et al., "Vergence-accommodation conflicts hinder visual performance and cause visual fatigue," Journal of Vision, Mar. 28, 2008, pp. 1-30.
Lang et al., "Nonlinear Disparity Mapping for Stereoscopic 3D," ACM Transactions on Graphics (TOG)—Proceedings of ACM SIGGRAPH 2010, Jul. 2010, pp. 1-10.
(Continued)

*Primary Examiner* — Nigar Chowdhury
(74) *Attorney, Agent, or Firm* — Jianq Chyun IP Office

(57) ABSTRACT

A stereoscopic image synthesis method includes the following: receiving a first image corresponding to a first view angle and a second image corresponding to a second view angle; obtaining a disparity map corresponding to the first image and the second image; determining a zero disparity region according to the disparity map; adjusting the disparity map according to the zero disparity region to obtain a shifted disparity map; linearly or non-linearly adjusting the shifted disparity map according to the shifted disparity map and a preset maximum range to obtain an adjusted disparity map; generating a plurality of virtual view angle images according to the adjusted disparity map, the first image, and the second image; and enhancing a two-dimensional depth cue of the virtual view angle images according to the adjusted disparity map.

12 Claims, 2 Drawing Sheets

(56) References Cited

U.S. PATENT DOCUMENTS

| | | | |
|---|---|---|---|
| 2013/0033582 A1 | 2/2013 | Sun et al. | |
| 2013/0057644 A1 | 3/2013 | Stefanoski et al. | |
| 2013/0106844 A1* | 5/2013 | Hong | H04N 13/0022 345/419 |
| 2014/0037117 A1* | 2/2014 | Tsingos | H04S 5/005 381/303 |
| 2014/0232820 A1* | 8/2014 | Ha | H04N 13/026 348/43 |

FOREIGN PATENT DOCUMENTS

| | | |
|---|---|---|
| CN | 102223556 | 10/2011 |
| CN | 102761761 | 10/2012 |
| CN | 103248904 | 8/2013 |
| CN | 103270759 | 8/2013 |
| CN | 103294387 | 9/2013 |
| CN | 103636200 | 3/2014 |

OTHER PUBLICATIONS

Shibata et al., "The zone of comfort: Predicting visual discomfort with stereo displays," Journal of Vision, Jul. 21, 2011, pp. 1-29.

Kim et al., "Visual Comfort Enhancement for Stereoscopic Video Based on Binocular Fusion Characteristics," IEEE Transactions on Circuits and Systems for Video Technology, Mar. 2013, pp. 482-487.

Woods et al., "Image Distortions in Stereoscopic Video Systems," Proceedings of the SPIE Stereoscopic Displays and Applications IV, Feb. 1993, pp. 36-48.

"View Synthesis Algorithm in View Synthesis Reference Software 2.0 (VSRS 2.0)," VSRS Software Manual, Nov. 17, 2008, pp. 1-14.

Okada et al., "Target spatial frequency determines the response to conflicting defocus- and convergence-driven accommodative stimuli," Vision Research, Feb. 2006, pp. 475-484.

Reddy et al., "Perceptually Optimized 3D Graphics," IEEE Computer Graphics and Applications, Sep./Oct. 2001, pp. 68-75.

Niu et al., "Image resizing via non-homogeneous warping," Multimedia Tools and Applications, Oct. 15, 2010, pp. 485-508.

\* cited by examiner

STEREOSCOPIC VIEW SYNTHESIS METHOD AND APPARATUS USING THE SAME

CROSS-REFERENCE TO RELATED APPLICATION

This application claims the priority benefit of Taiwan application serial no. 103119217, filed on Jun. 3, 2014. The entirety of the above-mentioned patent application is hereby incorporated by reference herein and made a part of this specification.

BACKGROUND OF THE INVENTION

Field of the Invention

The invention relates to image processing method and apparatus, and more particularly relates to stereoscopic image synthesis method and apparatus.

Description of Related Art

As technology advances, the display technology of large-sized displays, such as TVs, has entered a new era. More and more display manufacturers introduce displays that are capable of displaying stereoscopic image/video, which allows the general users to enjoy the stereoscopic display effect outside the theaters. However, the comfort that the viewer feels when watching stereoscopic images has not improved a lot. The reason is that the inconsistency between the focal length of human eyes and the visual axis causes vergence accommodation conflict. Generally, in order to avoid such a situation, the depth of the stereoscopic scene is suppressed when the display is set.

Such a setting can improve the comfort but would also significantly impair the stereoscopic effect.

SUMMARY OF THE INVENTION

The invention provides a stereoscopic image synthesis method and a stereoscopic image synthesis apparatus, adapted for generating a stereoscopic video image suitable for human eyes.

The stereoscopic image synthesis method of the invention includes the following. First, a first image corresponding to a first view angle and a second image corresponding to a second view angle are received. Next, a disparity map corresponding to an image content is obtained, and a zero disparity region in the image content is determined according to the disparity map, wherein the disparity map includes a plurality of disparity values corresponding to the first image and the second image. Then, the disparity map is adjusted according to the zero disparity region to obtain a shifted disparity map. Moreover, the shifted disparity map is adjusted linearly or non-linearly according to the shifted disparity map and a preset maximum range to obtain an adjusted disparity map. Further, a plurality of virtual view angle images are generated according to the adjusted disparity map, the first image, and the second image. A two-dimensional depth cue of the virtual view angle images is enhanced according to the adjusted disparity map.

The stereoscopic image synthesis apparatus of the invention includes: an image receiving unit, a data processing unit, and an image outputting unit. The image receiving unit receives a first image corresponding to a first view angle and a second image corresponding to a second view angle. The data processing unit is coupled to the image receiving unit. The image outputting unit is coupled to the data processing unit. The data processing unit obtains a disparity map corresponding to the first image and the second image, and determines a zero disparity region in an image content according to the disparity map, wherein the disparity map includes a plurality of disparity values corresponding to the image content. The data processing unit adjusts the disparity map according to the zero disparity region to obtain a shifted disparity map. The data processing unit linearly or non-linearly adjusts the shifted disparity map according to the shifted disparity map and a preset maximum range to obtain an adjusted disparity map. The data processing unit generates a plurality of virtual view angle images according to the adjusted disparity map, the first image, and the second image. The data processing unit enhances a two-dimensional depth cue of the virtual view angle images according to the adjusted disparity map. The image outputting unit outputs the virtual view angle images.

Based on the above, the stereoscopic image synthesis method and apparatus provided by the invention adjust the depth of the stereoscopic image according to visual characteristics of human eyes, such that vergence accommodation conflict is reduced without significantly impairing the stereoscopic effect.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
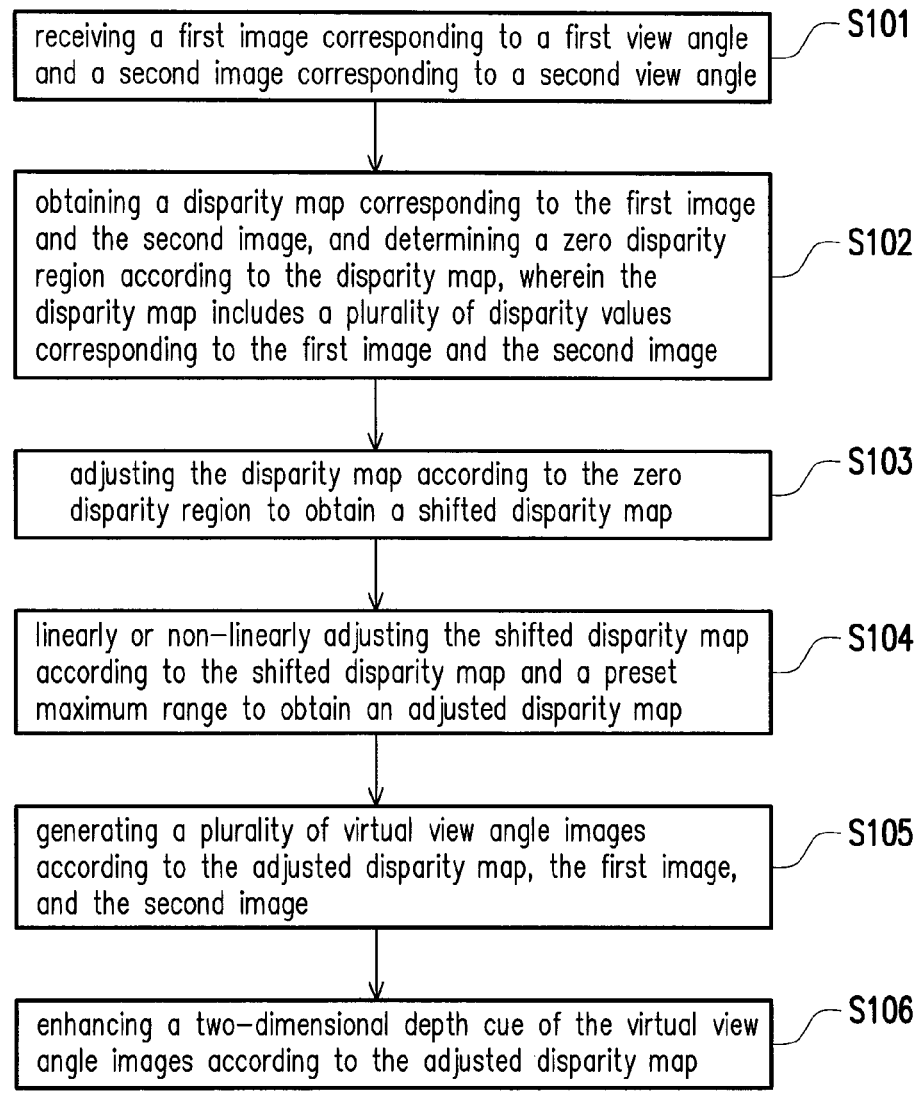
FIG. 1 is a flowchart illustrating a stereoscopic image synthesis method according to an embodiment of the invention.

FIG. 1 is a flowchart illustrating a stereoscopic image synthesis method according to an embodiment of the invention. With reference to FIG. 1, first, in Step S101, a first image corresponding to a first view angle and a second image corresponding to a second view angle are received. Then, in Step S102, a disparity map corresponding to the first image and the second image is obtained, and a zero disparity region is determined according to the disparity map, wherein the disparity map includes a plurality of disparity values corresponding to the first image and the second image. Next, in Step S103, the disparity map is adjusted according to the zero disparity region to obtain a shifted disparity map. In Step S104, the shifted disparity map is linearly or non-linearly adjusted according to the shifted disparity map and a preset maximum range to obtain an adjusted disparity map. Furthermore, in Step S105, a plurality of virtual view angle images are generated according to the adjusted disparity map, the first image, and the second image. Moreover, in Step S106, a two-dimensional depth cue of the virtual view angle images is enhanced.

Figure 2:
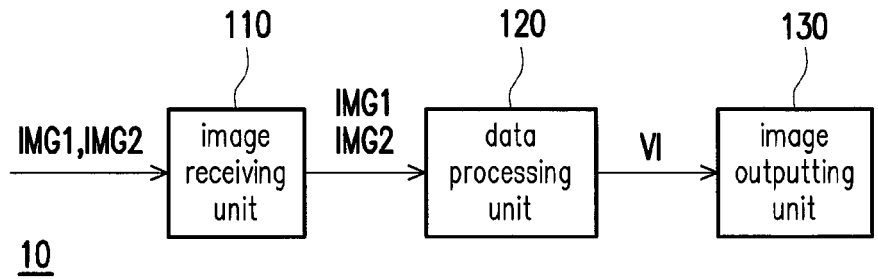
FIG. 2 is a functional block diagram illustrating a stereoscopic image synthesis apparatus according to an embodiment of the invention.

FIG. 2 is a functional block diagram illustrating a stereoscopic image synthesis apparatus according to an embodiment of the invention. With reference to FIG. 2, a stereoscopic image synthesis apparatus 10 includes an image receiving unit 110, a data processing unit 120, and an image outputting unit 130. The image receiving unit 110 receives a first image IMG1 corresponding to a first view angle and a second image IMG2 corresponding to a second view angle. The data processing unit 120 is coupled to the image receiving unit 110. The image outputting unit 130 is coupled to the data processing unit 120. The data processing unit 120 obtains a disparity map corresponding to an image content and determines a zero disparity region in the image content according to the disparity map, wherein the disparity map includes a plurality of disparity values corresponding to the image content.

The data processing unit 120 adjusts the disparity map according to the zero disparity region to obtain a shifted disparity map. The data processing unit 120 linearly or non-linearly adjusts the shifted disparity map according to the shifted disparity map and a preset maximum range to obtain an adjusted disparity map. The data processing unit 120 synthesizes the first image IMG1 and the second image IMG2 to generate a plurality of virtual view angle images VI according to the adjusted disparity map. The data processing unit 120 enhances a two-dimensional depth cue of the virtual view angle images VI. The image outputting unit 130 outputs the virtual view angle images VI.

Simply put, the stereoscopic image synthesis method and apparatus provided by the invention mainly include a pre-processing procedure (corresponding to Steps S101-S104 of FIG. 1) before an image synthesis step (Step S105 of FIG. 1) and a post-processing procedure (corresponding to Step S106 of FIG. 1) after the image synthesis step. The pre-processing procedure is mainly to adjust the disparity of the stereoscopic image to a range that can be watched comfortably by the viewer. The post-processing procedure is to further process the stereoscopic image according to the characteristics of the human eyes after synthesis of the virtual view angle images. Details of each step are explained hereinafter.

In this invention, the first image IMG1 and the second image IMG2 correspond to the same image content (e.g. a specific object or a specific scene) and are respectively captured at the first view angle and the second view angle. Moreover, the image mentioned in the invention (e.g. the first image IMG1 and the second image IMG2) may be a frame of a video stream. For example, the first image IMG1 is a frame of the video stream captured by a camera located at the first view angle, and the second image IMG2 is a frame of the video stream captured by a camera located at the second view angle. In addition, the first image IMG1 and the second image IMG2 may also be still images. However, it is noted that the invention is not limited thereto.

With reference to FIG. 1 and FIG. 2, first, the image receiving unit 110 of the stereoscopic image synthesis apparatus 10 receives the first image IMG1 and the second image IMG2 (Step S101). The first image IMG1 and the second image IMG2 may be deemed as the image contents of the same object, which are respectively captured at two different view angles (i.e. the first view angle and the second view angle). For example, the first image IMG1 corresponds to the image content seen by the left eye of the user and the second image IMG2 corresponds to the image content seen by the right eye of the user.

In this embodiment, the image receiving unit 110 only receives the first image IMG1 and the second image IMG2. However, in other embodiments of the invention, the image receiving unit 110 may simultaneously receive part of or all of a plurality of images (i.e. multi-view images) that are captured at other view angles at the same time point when the first image IMG1 and the second image IMG2 are captured, and simultaneously transmit these images to the data processing unit 120 after receiving these images. However, it should be noted that the invention is not limited to such a configuration. Basically, the data processing unit 120 synthesizes and obtains better virtual view angle images VI if more images are captured at the same time at different view angles.

Next, after the data processing unit 120 receives the first image IMG1 and the second image IMG2, the data processing unit 120 obtains the disparity map of the image content corresponding to the first image IMG1 and the second image IMG2, and determines the zero disparity region in the disparity map according to the disparity map (Step S102). The disparity map includes a disparity value of each pixel in the image content corresponding to the first image IMG1 and the second image IMG2.

The disparity map can be obtained by various methods. For example, the disparity map may be obtained by analyzing and comparing the first image IMG1 and the second image IMG2 after the data processing unit 120 obtains the first image IMG1 and the second image IMG2; or the disparity map may be obtained by converting information relating to the first image IMG1 and the second image IMG2.

For example, the data processing unit 120 may simultaneously receive stereo correspondence information corresponding to the first image IMG1 and the second image IMG2 when receiving the first image IMG1 and the second image IMG2 through the image receiving unit 110, and the data processing unit 120 converts the stereo correspondence information to the disparity map. The stereo correspondence information may be a depth map, which includes a relative depth value of each pixel of the image content corresponding to the first image IMG1 and the second image IMG2. For example, the depth map may be a depth map of the first image IMG1 with respect to the second image IMG2. Alternatively, the stereo correspondence information may also include a depth map of the first image IMG1 with respect to a virtual image of another view angle and a depth map of the second image IMG2 with respect to this virtual image. However, it should be noted that the invention is not limited thereto.

Therefore, simply put, in the invention, the image receiving unit 110 is capable of receiving images of two different view angles (e.g. the first image IMG1 seen by the left eye and the second image IMG2 seen by the right eye), images of two different view angles and the disparity map (corresponding to the stereo correspondence information) or depth map (disparity maps respectively corresponding thereto or a relative disparity map therebetween) corresponding to the two images, images of any two different view angles in the multi-view image, or images of any two different view angles in the multi-view image and the disparity map or depth map corresponding thereto. However, it should be noted that the invention is not limited thereto.

On the other hand, because the pixels corresponding to the same object in the image content have similar disparities (or corresponding depths), after obtaining the disparity map of the image content corresponding to the first image IMG1 and the second image IMG2, the data processing unit 120 could divide the image content corresponding to the first image IMG1 and the second image IMG2 into a plurality of object regions according to the disparity map, wherein the depth values in one object region are similar. After the data processing unit 120 divides the image content corresponding to the first image IMG1 and the second image IMG2 into the object regions, the data processing unit 120 further determines one of the object regions as the zero disparity region.

The depth value corresponding to the zero disparity region is 0. That is, the zero disparity region corresponds to a plane that matches a screen of the display. In other words, when displaying a stereoscopic image (e.g. the virtual view angle images), the zero disparity region is a region that the viewer can watch most comfortably. The data processing unit 120 may determine the object region, which corresponds to a view focus of the viewer, among the object regions as the zero disparity region and further adjust the disparity value of this object region to 0, such that the viewer can watch the object region most comfortably and without any extra efforts.

The data processing unit 120 may determine one of the object regions as the zero disparity region according to an interest region. The data processing unit 120 can obtain the interest region by executing an interest region detection procedure (e.g. performing calculation using a specific algorithm) according to the image content and the object regions, or the user can input a region of interesting (ROI). It should be noted that the user could be the viewer of the stereoscopic image and could be a producer of the image content (i.e. the first image IMG1 and the second image IMG2, or a first video stream and a second video stream corresponding to the first image IMG1 and the second image IMG2). For example, the producer may assign the region of interesting when producing the image content, e.g. designating the zero disparity region on a main object in the image content or on an object that the producer wishes the viewer to focus on. The producer of the image content can generate an operation signal (or operation message) including the interest region through an operation and attach the operation signal to the first image IMG1, the second image IMG2, or the stereo correspondence information to be received by the image receiving unit 110 and to be transmitted to the data processing unit 120.

In addition, in order to prevent the focused object region from switching too frequently, the data processing unit 120 may also refer to the zero disparity region in the image content corresponding to the first image IMG1 and the second image IMG2 at a previous time point (e.g., frames of the first image IMG1 and the second image IMG2 at the previous time point in the video stream including the first image IMG1 and the second image IMG2) in addition to referring to the interest region. The data processing unit 120 determines the zero disparity region in the image content corresponding to the first image IMG1 and the second image IMG2 selectively according to the aforementioned information (each object region in the image content, the interest region generated through calculation by detecting each object region, the interest region designated by the user, and/or the zero disparity region of the previous time point).

After determining the zero disparity region, the data processing unit 120 adjusts the disparity map according to the zero disparity region to obtain the shifted disparity map (Step S103). Simply put, the disparity value of the zero disparity region is adjusted to zero, and the disparity values of the rest of the object regions in the disparity map are adjusted corresponding to the original disparity value of the zero disparity region. For example, the shifted disparity map is obtained by respectively subtracting the original disparity value of the zero disparity region from the disparity values of each of the object regions in the whole disparity map. However, it should be noted that the invention is not limited thereto.

After adjusting the disparity map to obtain the shifted disparity map, the data processing unit 120 may linearly or non-linearly adjust the shifted disparity map according to the shifted disparity map and the preset maximum range to obtain the adjusted disparity map (Step S104). The preset maximum range may include a preset maximum disparity value and a preset minimum disparity value, which respectively may correspond to a maximum disparity value and a minimum disparity value acceptable to the viewer (i.e., the human eyes). Through experiment, it is known that, when the disparity value exceeds the maximum disparity value and the minimum disparity value that are acceptable to the human eyes, the synthesized image does not increase the stereoscopic effect sensed by the viewer but may worsen the vergence accommodation conflict instead. Therefore, by adjusting the shifted disparity map linearly or non-linearly according to the preset maximum range, the comfort that the user feels when watching the three-dimensional stereoscopic image is improved.

The preset maximum range may be preset in the data processing unit 120. In an embodiment of the invention, the stereoscopic image synthesis apparatus 10 may be disposed in a display. In this embodiment, the stereoscopic image synthesis apparatus 10 may obtain information data, such as the size of the display and a distance between the user and the display, through the display. The data processing unit 120 may then calculate a maximum disparity range acceptable to the viewer based on the information data and sets/updates the preset maximum range according to the maximum disparity range. The distance between the user and the display may be inputted by the user through an operation interface of the display, or may be detected and obtained directly through a detector or an imaging unit (not shown). However, it should be noted that the invention is not limited thereto.

In this embodiment, the data processing unit 120 resets the maximum range of the disparity value according to the shifted disparity map and the preset maximum range (that is, an maximum adjusted disparity value and an minimum adjusted disparity value). First, the data processing unit 120 sets the maximum disparity value in the shifted disparity map as a maximum shifted disparity value and sets the minimum disparity value in the shifted disparity map as a minimum shifted disparity value. The operation of resetting the maximum range of the disparity value is represented by the following equations (1) and (2):

$$d\max''=\text{MIN}(d\max,d\max') \quad (1)$$

$$d\min''=\text{MAX}(d\min,d\min') \quad (2)$$

dmax" represents the maximum adjusted disparity value, dmax' represents the preset maximum disparity value, and dmax represents the maximum shifted disparity value. dmin" represents the minimum adjusted disparity value, dmin' represents the preset minimum disparity value, and dmin represents the minimum shifted disparity value. Equation (1) represents that the maximum adjusted disparity value dmax" is equal to the smaller one of the maximum shifted disparity value dmax and the preset maximum disparity value dmax'. Equation (2) represents that the minimum adjusted disparity value dmin" is equal to the larger one of the minimum shifted disparity value dmin and the preset minimum disparity value dmin'.

After obtaining the maximum adjusted disparity value dmax' and the minimum adjusted disparity value dmin", the data processing unit 120 linearly or non-linearly adjusts the shifted disparity map according to the maximum adjusted disparity value dmax" and the minimum adjusted disparity value dmin" to obtain the adjusted disparity map. Below two conversion methods are provided. One is to adjust the disparity value of each pixel in the shifted disparity map according to a ratio of the maximum adjusted disparity value dmax" and the minimum adjusted disparity value dmin", which is represented by the following equations (3) and (4):

$$d' = (d*dmax"/dmax), \text{ when } dmax">d>0 \quad (3)$$

$$d' = (d*dmin"/dmin), \text{ when } 0>d>dmin" \quad (4)$$

d' represents the adjusted disparity value in the adjusted disparity map corresponding to each pixel in the image content, and d represents the shifted disparity value in the shifted disparity map corresponding to each pixel in the image content.

The other conversion method is to adjust the disparity value of each pixel in the shifted disparity map exponentially according to the maximum adjusted disparity value dmax" and the minimum adjusted disparity value dmin", which is represented by the following equations (5) and (6).

$$d' = [(1+dmax")^{d/dmax} - 1], \text{ when } d>0 \quad (5)$$

$$d' = [1 - (1-dmin")^{d/dmin}], \text{ when } d<0 \quad (6)$$

However, the invention is not limited to using one of the aforementioned two conversion methods. The meaning of linearly or non-linearly adjusting the shifted disparity map is to improve the comfort of the viewer. To further simplify the above configuration, in an embodiment of the invention, the data processing unit 120 directly sets a disparity value that exceeds the preset maximum range as the preset maximum disparity value or the preset minimum disparity value. For example, if the disparity value of one object region of the shifted disparity map is smaller than the preset minimum disparity value, the data processing unit 120 directly sets the disparity value of each pixel in the object region as the preset minimum disparity value. However, it should be noted that the invention is not limited to the above configuration.

Figures 3A, 3B, 3C:
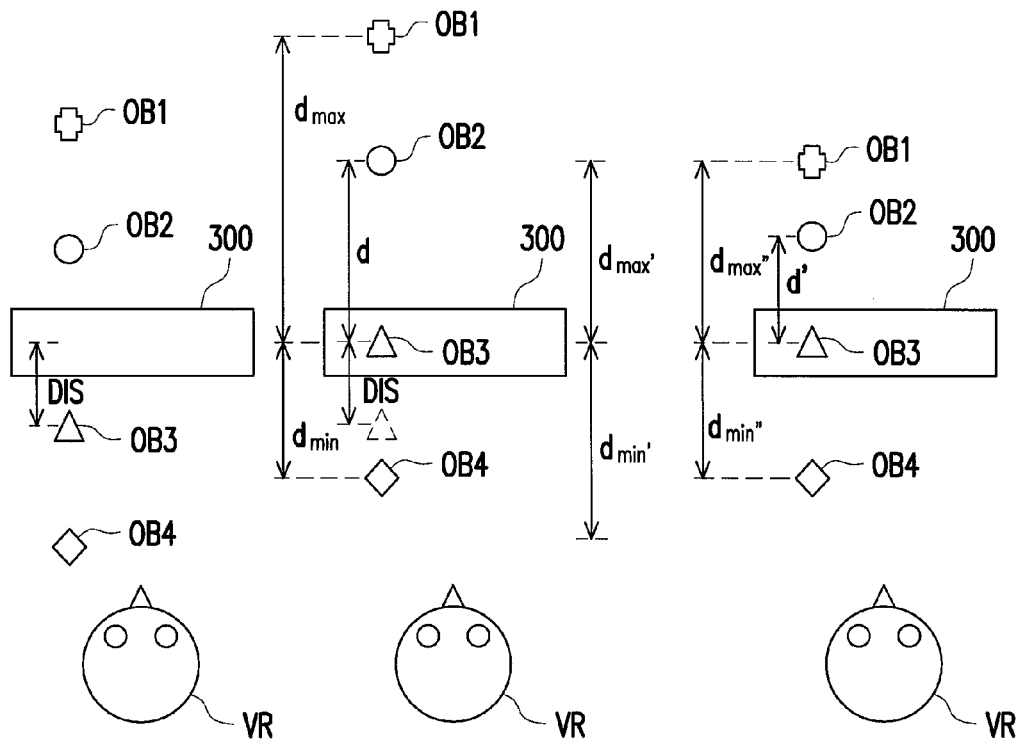
FIG. 3A is a schematic diagram illustrating the relationship between a display, a viewer, and an object displayed according to a disparity map in an embodiment of the invention.
FIG. 3B is a schematic diagram illustrating the relationship between the display, the viewer, and an object displayed according to a shifted disparity map in an embodiment of the invention.
FIG. 3C is a schematic diagram illustrating the relationship between the display, the viewer, and an object displayed according to an adjusted disparity map in an embodiment of the invention.

FIG. 3A to FIG. 3C schematically illustrate the relationship between the viewer, the display, and objects with different disparity values in the image content. To facilitate the explanation, although the objects in FIG. 3A to FIG. 3C are represented by disparity values, the positions of the objects in FIG. 3A to FIG. 3C correspond to depth values converted from the disparity values of the objects. FIG. 3A is a schematic diagram illustrating the relationship between the display, the viewer, and the object displayed according to the disparity map in an embodiment of the invention. With reference to FIG. 2 and FIG. 3A, the image content corresponding to the first image and the second image includes objects OB1-OB4. In this embodiment, the object OB1 has the maximum disparity value (depth value) in the image content, and the object OB2 has the second large disparity value. For the viewer VR, the objects OB1 and OB2 sink into the display 300. The object OB4 has the minimum disparity value (depth value) in the image content, and the object OB3 has the second small disparity value. For the viewer, the objects OB3 and OB4 stand in front of the display 300.

After determining the zero disparity region (e.g. Step S102 of FIG. 1), the object OB3 is determined as the zero disparity region. Because the object OB3 does not fall on the plane of the display 300, the data processing unit 120 generates the shifted disparity map according to a disparity distance DIS between the object OB3 and the plane of the display 300. The objects OB1-OB4 displayed according to the shifted disparity map are shown in FIG. 3B.

FIG. 3B is a schematic diagram illustrating the relationship between the display, the viewer, and the object displayed according to the shifted disparity map in an embodiment of the invention. With reference to FIG. 3B, after the objects OB1-OB4 are shifted for the disparity distance DIS from the positions shown in FIG. 3A, the objects OB1-OB4 are shifted in parallel deeper into the display. In FIG. 3B, the disparity distance (corresponding to the depth) between the object OB1 and the plane of the display 300 is the maximum shifted disparity value dmax of the equation (1). Likewise, the disparity distance (corresponding to the depth) between the object OB4 and the plane of the display 300 is the minimum shifted disparity value dmin of the equation (2). Here, the disparity distance between the object OB2 and the plane of the display 300 is represented by a shifted disparity value d of the equations (3) and (4).

With reference to FIG. 3B, in this embodiment, the preset maximum disparity value dmax' and the preset minimum disparity value dmin' preset by the data processing unit 120 are shown in the figures, wherein the preset maximum disparity value dmax' is smaller than the maximum shifted disparity value dmax, and the preset minimum disparity value dmin' is also smaller than the minimum shifted disparity value dmin. According to the equations (1) and (2), the data processing unit 120 determines that the maximum adjusted disparity value dmax" is equal to the preset maximum disparity value dmax', and the minimum adjusted disparity value dmin" is equal to the minimum shifted disparity value dmin. The data processing unit 120 then further adjusts the shifted disparity map to obtain the adjusted disparity map according to the maximum adjusted disparity value dmax" and the minimum adjusted disparity value dmin' (Step S104).

FIG. 3C is a schematic diagram illustrating the relationship between the display, the viewer, and the object displayed according to the adjusted disparity map in an embodiment of the invention. FIG. 3C illustrates the objects OB1-OB4 displayed according to the adjusted disparity map. The object OB1 is adjusted to a position where the disparity distance with respect to the display 300 is the maximum adjusted disparity value dmax". Because the minimum adjusted disparity value dmin" is equal to the minimum shifted disparity value dmin, the position of the object OB4 remains the same as disclosed in FIG. 3B. The disparity distance (i.e. the shifted disparity value) d of the object OB2 is between 0 (the plane of the display 300; the positions of the object OB3 and the zero disparity region)

and the maximum adjusted disparity value dmax'. The data processing unit 120 obtains an adjusted disparity value d' by the equation (3).

With reference to FIG. 1 and FIG. 2, after completing the adjustment of the disparity map, the data processing unit 120 synthesizes the first image IMG1 and the second image IMG2 according to the adjusted disparity map to generate a plurality of virtual view angle images VI (Step S105) and transmits the virtual view angle images VI to the image outputting unit to be displayed by the display (e.g. the display 300 shown in FIG. 3A to FIG. 3C). By displaying the image content of the disparity/depth relationship of FIG. 3C through the display 300 provided with the stereoscopic image synthesis apparatus 10, the viewer VR can comfortably watch the stereoscopic image (the virtual view angle images). Various methods are available for generating the virtual view angle images VI according to the first image IMG1, the second image IMG2 (or images of other view angles), and the adjusted disparity map, and thus are not specified hereinafter.

In this invention, the data processing unit 120 further enhances a two-dimensional depth cue of the virtual view angle images before transmitting the virtual view angle images IV to the image outputting unit 130 for display (Step S106). The two-dimensional depth cue refers to a cue of the depth that the viewer can directly feel from the image when watching a two-dimensional image (e.g. the first image IMG1 and the second image IMG2). The cue may be a relationship of sizes of the objects, clarity, or a relationship of the objects that shield each other. For example, in this embodiment, the data processing unit 120 uses a low pass filtering process with different intensities and adjusts a proportion of the objects of the zero disparity region in the image content to enhance the two-dimensional depth cue.

Figure 4A:
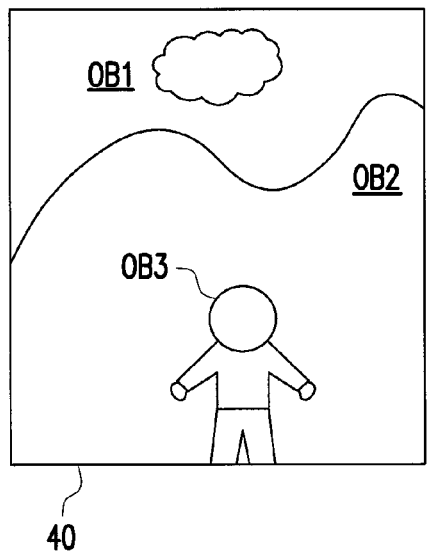
FIG. 4A and FIG. 4B are schematic diagrams illustrating a virtual view angle image according to an embodiment of the invention.
Figure 4B:
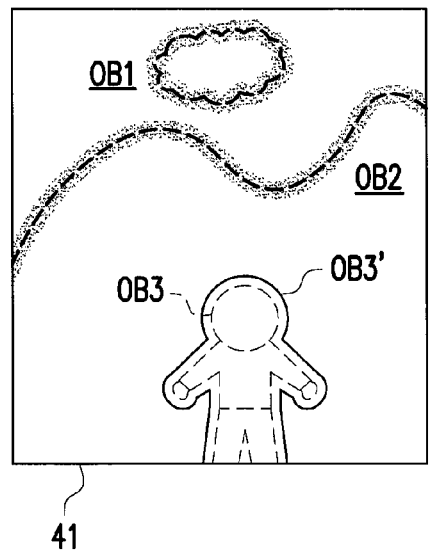

FIG. 4A and FIG. 4B are schematic diagrams illustrating a virtual view angle image according to an embodiment of the invention. A virtual view angle image 40 illustrated by FIG. 4A is the image content before enhancement of the two-dimensional depth cue in Step S106. A virtual view angle image 41 illustrated by FIG. 4B is the image content after enhancement of the two-dimensional depth cue in Step S106. With reference to FIG. 4A, the virtual view angle image 40 mainly includes three objects OB1-OB3, wherein the object OB1 represents the sky and has the largest disparity value (depth), and the object OB2 is a mountain and has the second large disparity value. The object OB3 represents a person, which is determined as the zero disparity region and the disparity value thereof is 0.

With reference to FIG. 4B, first the data processing unit 120 adjusts the regions whose disparity values are not 0. The data processing unit 120 applies more intense low pass filtering on the object that is disparity-farther away from the zero disparity region (which may refer to the object that is physically farther away from the object which is determined as the zero disparity region in the image content), such that blurring effect of the object is gradually enhanced as the disparity distance from the zero disparity region increases. Thus, the viewer keeps more focus on the zero disparity region. For example, the object OB1 is farther away than the object OB2. Thus, the data processing unit 120 applies more intense low pass filtering on the object OB1 than the object OB2. The low pass filtering process is not only related to the disparity values, but also related to information, such as a focus moving speed of the image content at each time point and the distance between each pixel and the focus. However, it should be noted that the invention is not limited to the above configuration.

In addition, the data processing unit 120 adjusts the zero disparity region in the image content, i.e. adjusting the proportion of the object OB3 to enhance the two-dimensional depth cue. In this embodiment, because the object OB3 is a person that is far away from the objects OB1 and OB2 (respectively corresponding to the sky and the mountain), the data processing unit 120 determines to increase the proportion of the object OB3 (adjusting the proportion of the object OB3 illustrated by the dotted lines to the proportion of an object OB3' illustrated by the solid lines). The size of the object is also one two-dimensional depth cue. Because of the structure of the human eyes, the viewer deems larger objects are closer in distance. By adjusting the object to appear larger in size, the viewer may recognize that the object OB3 is closer, which slightly generates a pop-out effect. Therefore, the stereoscopic effect of the virtual view angle images is enhanced without affecting the comfort of the viewer.

In conclusion of the above, the invention provides the stereoscopic image synthesis method and apparatus that take the depth/disparity range acceptable to the human eyes into consideration when synthesizing the stereoscopic image (i.e. the virtual view angle images) and correct the result of image synthesis according to the focal length and visual axis of human eyes, such that the viewer can comfortably and fully enjoy the stereoscopic effect. The stereoscopic image synthesis apparatus can be further integrated into a display, such as a television and a smart TV. By storing the setting in the storage unit of the display, or obtaining the required parameters through the processing unit and/or the input and output interface of the display, the obtained stereoscopic image can better meet the user's need.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A stereoscopic image synthesis method, comprising:
receiving a first image corresponding to a first view angle and a second image corresponding to a second view angle;
obtaining a disparity map corresponding to the first image and the second image, and determining a zero disparity region according to the disparity map, wherein the disparity map comprises a plurality of disparity values corresponding to the first image and the second image;
adjusting the disparity map according to the zero disparity region to obtain a shifted disparity map;
linearly or non-linearly adjusting the shifted disparity map according to the shifted disparity map and a preset maximum range to obtain an adjusted disparity map;
generating a plurality of virtual view angle images according to the adjusted disparity map, the first image, and the second image; and
enhancing a two-dimensional depth cue of the virtual view angle images according to the adjusted disparity map.

2. The stereoscopic image synthesis method according to claim 1, wherein the step of determining the zero disparity region in the disparity map comprises:
dividing the disparity map into a plurality of object regions according to the disparity values; and determining one of the object regions in the disparity map as the zero disparity region according to an interest region and/or the zero disparity region of a previous time point.

3. The stereoscopic image synthesis method according to claim 2, wherein before the step of determining the zero disparity region in the disparity map, the stereoscopic image synthesis method further comprises:

executing an interest region detection procedure to obtain the interest region corresponding to one of the object regions, or receiving a control signal and generating the interest region according to the control signal.

4. The stereoscopic image synthesis method according to claim 1, wherein the preset maximum range comprises a preset maximum disparity value and a preset minimum disparity value, and the step of linearly or non-linearly adjusting the shifted disparity map according to the zero disparity region and the preset maximum range comprises:

obtaining a maximum shifted disparity value and a minimum shifted disparity value in the shifted disparity map;

selecting the smaller one of the maximum shifted disparity value and the preset maximum disparity value as an maximum adjusted disparity value;

selecting the larger one of the minimum shifted disparity value and the preset minimum disparity value as an minimum adjusted disparity value; and linearly or non-linearly adjusting the shifted disparity map according to the maximum adjusted disparity value and the minimum adjusted disparity value to obtain the adjusted disparity map.

5. The stereoscopic image synthesis method according to claim 1, wherein the step of enhancing the two-dimensional depth cue of the virtual view angle images comprises:

performing a low pass filtering process on a portion outside the zero disparity region in the virtual view angle images according to the adjusted disparity map.

6. The stereoscopic image synthesis method according to claim 1, wherein the step of enhancing the two-dimensional depth cue of the virtual view angle images comprises:

adjusting a proportion of the zero disparity region in the virtual view angle images.

7. A stereoscopic image synthesis apparatus, comprising:

an image receiving unit receiving a first image corresponding to a first view angle and a second image corresponding to a second view angle;

a data processing unit coupled to the image receiving unit; and an image outputting unit coupled to the data processing unit, wherein the data processing unit obtains a disparity map corresponding to the first image and the second image, and determines a zero disparity region according to the disparity map, wherein the disparity map comprises a plurality of disparity values corresponding to the first image and the second image;

wherein the data processing unit adjusts the disparity map according to the zero disparity region to obtain a shifted disparity map;

the data processing unit linearly or non-linearly adjusts the shifted disparity map according to the shifted disparity map and a preset maximum range to obtain an adjusted disparity map;

the data processing unit generates a plurality of virtual view angle images according to the adjusted disparity map, the first image, and the second image;

the data processing unit enhances a two-dimensional depth cue of the virtual view angle images according to the adjusted disparity map; and wherein the image outputting unit outputs the virtual view angle images.

8. The stereoscopic image synthesis apparatus according to claim 7, wherein:

the data processing unit divides the disparity map into a plurality of object regions according to the disparity values; and the data processing unit determines one of the object regions in the disparity map as the zero disparity region according to an interest region and/or the zero disparity region of a previous time point.

9. The stereoscopic image synthesis apparatus according to claim 8, wherein:

the data processing unit executes an interest region detection procedure to obtain the interest region corresponding to one of the object regions, or receives a control signal and generates the interest region according to the control signal.

10. The stereoscopic image synthesis apparatus according to claim 7, wherein:

the preset maximum range comprises a preset maximum disparity value and a preset minimum disparity value, wherein the data processing unit obtains a maximum shifted disparity value and a minimum shifted disparity value in the shifted disparity map;

the data processing unit selects the smaller one of the maximum shifted disparity value and the preset maximum disparity value as an maximum adjusted disparity value;

the data processing unit selects the larger one of the minimum shifted disparity value and the preset minimum disparity value as an minimum adjusted disparity value; and the data processing unit linearly or non-linearly adjusts the shifted disparity map according to the maximum adjusted disparity value and the minimum adjusted disparity value to obtain the adjusted disparity map.

11. The stereoscopic image synthesis apparatus according to claim 7, wherein:

the data processing unit performs a low pass filtering process on a portion outside the zero disparity region in the virtual view angle images according to the adjusted disparity map.

12. The stereoscopic image synthesis apparatus according to claim 7, wherein:

the data processing unit adjusts a proportion of the zero disparity region in the virtual view angle images.

* * * * *